(12) United States Patent
Fink et al.

(10) Patent No.: US 10,261,763 B2
(45) Date of Patent: Apr. 16, 2019

(54) EXTENSIBLE DATA TRANSFORMATION AUTHORING AND VALIDATION SYSTEM

(71) Applicant: Palantir Technologies Inc., Palo Alto, CA (US)

(72) Inventors: Robert Fink, San Francisco, CA (US); Matthew Cheah, Mountain View, CA (US); Mingyu Kim, Palo Alto, CA (US); Lynn Cuthriell, San Francisco, CA (US); Divyanshu Arora, New York, NY (US); Justin Uang, London (GB); Jared Newman, New York, NY (US); Jakob Juelich, London (GB); Kevin Chen, Menlo Park, CA (US); Mark Elliot, New York, NY (US); Michael Nazario, Menlo Park, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/839,680

(22) Filed: Dec. 12, 2017

(65) Prior Publication Data
US 2018/0165072 A1    Jun. 14, 2018

Related U.S. Application Data

(60) Provisional application No. 62/433,569, filed on Dec. 13, 2016.

(51) Int. Cl.
*G06F 9/44* (2018.01)
*G06F 9/45* (2006.01)
(Continued)

(52) U.S. Cl.
CPC .................. *G06F 8/40* (2013.01); *G06F 8/22* (2013.01); *G06F 8/311* (2013.01); *G06F 8/71* (2013.01); *G06F 21/30* (2013.01)

(58) Field of Classification Search
CPC ..... G06F 8/40–8/41; G06F 8/22; G06F 8/311; G06F 8/71; G06F 21/30
See application file for complete search history.

(56) References Cited

U.S. PATENT DOCUMENTS

| | | |
|---|---|---|
| 5,418,950 A | 5/1995 | Li et al. |
| 5,428,737 A | 6/1995 | Li et al. |

(Continued)

FOREIGN PATENT DOCUMENTS

| | | |
|---|---|---|
| DE | 102014103482 | 9/2014 |
| EP | 1647908 | 4/2006 |

(Continued)

OTHER PUBLICATIONS

European Patent Office, "Search Report" in application No. 17206940.3-1224, dated May 14, 2018, 10 pages. European Claims in application No. 17206940.3-1224, dated May 2018, 2 pages.

(Continued)

*Primary Examiner* — Mongbao Nguyen
(74) *Attorney, Agent, or Firm* — Hickman Palermo Becker Bingham LLP

(57) ABSTRACT

Data transformation in a distributed system of applications and data repositories is described. The subsystems for the overall framework are distributed, thereby allowing for customization to require only isolated changes to one or more subsystems. In one embodiment, a source code repository is used to receive and store source code. A build subsystem can retrieve source code from the source code repository and build it, using one or more criteria. By building the source code, the build subsystem can generate an artifact, which is executable code, such as a JAR or SQL file. Likewise, by building the source code, the build subsystem can generate one or more job specifications for executing the executable code. In one embodiment, the artifact and job specification may be used to launch an (Continued)

application server in a cluster. The application server can then receive data transformation instructions and execute the data transformation instructions.

12 Claims, 7 Drawing Sheets

(51) Int. Cl.
  *G06F 8/40* (2018.01)
  *G06F 8/20* (2018.01)
  *G06F 21/30* (2013.01)
  *G06F 8/71* (2018.01)
  *G06F 8/30* (2018.01)

(56) References Cited

U.S. PATENT DOCUMENTS

| | | |
|---|---|---|
| 5,428,776 A | 6/1995 | Rothfield |
| 5,542,089 A | 7/1996 | Lindsay et al. |
| 5,608,899 A | 3/1997 | Li et al. |
| 5,613,105 A | 3/1997 | Xbikowski et al. |
| 5,701,456 A | 12/1997 | Jacopi et al. |
| 5,724,575 A | 3/1998 | Hoover et al. |
| 5,794,228 A | 8/1998 | French et al. |
| 5,794,229 A | 8/1998 | French et al. |
| 5,857,329 A | 1/1999 | Bingham |
| 5,911,138 A | 6/1999 | Li et al. |
| 5,918,225 A | 6/1999 | White et al. |
| 6,208,985 B1 | 3/2001 | Krehel |
| 6,236,994 B1 | 5/2001 | Swartz et al. |
| 6,289,334 B1 | 9/2001 | Reiner et al. |
| 6,311,181 B1 | 10/2001 | Lee et al. |
| 6,321,274 B1 | 11/2001 | Shakib et al. |
| 6,643,613 B2 | 11/2003 | McGee et al. |
| 6,745,382 B1 | 6/2004 | Zothner |
| 6,851,108 B1 | 2/2005 | Syme et al. |
| 6,857,120 B1 | 2/2005 | Arnold et al. |
| 6,877,137 B1 | 4/2005 | Rivette et al. |
| 6,976,024 B1 | 12/2005 | Chavez et al. |
| 7,028,223 B1 | 4/2006 | Kolawa et al. |
| 7,085,890 B2 | 8/2006 | Kashyap |
| 7,155,728 B1 | 12/2006 | Prabhu et al. |
| 7,216,133 B2 | 5/2007 | Wu et al. |
| 7,406,592 B1 | 7/2008 | Polyudov |
| 7,519,589 B2 | 4/2009 | Charnock et al. |
| 7,546,353 B2 | 6/2009 | Hesselink et al. |
| 7,610,290 B2 | 10/2009 | Kruy et al. |
| 7,627,489 B2 | 12/2009 | Schaeffer et al. |
| 7,783,679 B2 | 8/2010 | Bley |
| 7,853,573 B2 | 12/2010 | Warner et al. |
| 7,877,421 B2 | 1/2011 | Berger et al. |
| 7,908,521 B2 | 3/2011 | Sridharan et al. |
| 7,979,424 B2 | 7/2011 | Dettinger et al. |
| 8,073,857 B2 | 12/2011 | Sreekanth |
| 8,103,962 B2 | 1/2012 | Embley et al. |
| 8,417,715 B1 | 4/2013 | Bruckhaus et al. |
| 8,429,194 B2 | 4/2013 | Aymeloglu et al. |
| 8,433,702 B1 | 4/2013 | Carrino et al. |
| 8,499,287 B2 | 7/2013 | Shafi et al. |
| 8,560,494 B1 | 10/2013 | Downing |
| 8,639,552 B1 | 1/2014 | Chen et al. |
| 8,799,867 B1 | 8/2014 | Peri-Glass et al. |
| 8,909,597 B2 | 12/2014 | Aymeloglu et al. |
| 8,924,429 B1 | 12/2014 | Fisher et al. |
| 8,935,201 B1 | 1/2015 | Fisher et al. |
| 9,031,981 B1 | 5/2015 | Potter et al. |
| 9,105,000 B1 | 8/2015 | White et al. |
| 9,292,388 B2 | 3/2016 | Fisher et al. |
| 9,330,120 B2 | 5/2016 | Colgrove et al. |
| 9,348,677 B2 | 5/2016 | Marinelli, III et al. |
| 9,378,526 B2 | 6/2016 | Sampson |
| 2002/0184111 A1 | 12/2002 | Swanson |
| 2003/0004770 A1 | 1/2003 | Miller et al. |
| 2003/0023620 A1 | 1/2003 | Trotta |
| 2003/0105833 A1 | 6/2003 | Daniels |
| 2003/0212670 A1 | 11/2003 | Yalamanchi et al. |
| 2004/0088177 A1 | 5/2004 | Travis et al. |
| 2004/0098731 A1 | 5/2004 | Demsey et al. |
| 2004/0103088 A1 | 5/2004 | Cragun et al. |
| 2004/0126840 A1 | 7/2004 | Cheng et al. |
| 2004/0139212 A1 | 7/2004 | Mukherjee et al. |
| 2004/0153837 A1 | 8/2004 | Preston et al. |
| 2004/0193608 A1 | 9/2004 | Gollapudi et al. |
| 2004/0254658 A1 | 12/2004 | Sherriff et al. |
| 2004/0260702 A1 | 12/2004 | Cragun et al. |
| 2005/0004911 A1 | 1/2005 | Goldberg et al. |
| 2005/0021397 A1 | 1/2005 | Cui et al. |
| 2005/0120080 A1 | 6/2005 | Weinreb et al. |
| 2005/0183005 A1 | 8/2005 | Denoue et al. |
| 2005/0226473 A1 | 10/2005 | Ramesh |
| 2005/0278286 A1 | 12/2005 | Djugash et al. |
| 2006/0004740 A1 | 1/2006 | Dettinger et al. |
| 2006/0070046 A1 | 3/2006 | Balakrishnan et al. |
| 2006/0074967 A1 | 4/2006 | Shaburov |
| 2006/0080616 A1 | 4/2006 | Vogel et al. |
| 2006/0116991 A1 | 6/2006 | Calderwood |
| 2006/0129992 A1 | 6/2006 | Oberholtzer et al. |
| 2006/0142949 A1 | 6/2006 | Helt |
| 2006/0209085 A1 | 9/2006 | Wong et al. |
| 2006/0271838 A1 | 11/2006 | Carro |
| 2006/0271884 A1 | 11/2006 | Hurst |
| 2006/0288046 A1 | 12/2006 | Gupta et al. |
| 2007/0005582 A1 | 1/2007 | Navratil et al. |
| 2007/0027851 A1 | 2/2007 | Kruy et al. |
| 2007/0094248 A1 | 4/2007 | McVeigh et al. |
| 2007/0113164 A1 | 5/2007 | Hansen et al. |
| 2007/0150805 A1 | 6/2007 | Misovski |
| 2007/0168336 A1 | 7/2007 | Ransil et al. |
| 2007/0178501 A1 | 8/2007 | Rabinowitz et al. |
| 2007/0192281 A1 | 8/2007 | Cradick et al. |
| 2007/0260582 A1 | 11/2007 | Liang |
| 2008/0126344 A1 | 5/2008 | Hoffman et al. |
| 2008/0126951 A1 | 5/2008 | Sood et al. |
| 2008/0155440 A1 | 6/2008 | Trevor et al. |
| 2008/0196016 A1 | 8/2008 | Todd |
| 2008/0201313 A1 | 8/2008 | Dettinger et al. |
| 2008/0215543 A1 | 9/2008 | Huang et al. |
| 2008/0267386 A1 | 10/2008 | Cooper |
| 2008/0288921 A1* | 11/2008 | Jacob ............... G06F 21/14 717/120 |
| 2009/0006150 A1 | 1/2009 | Prigge et al. |
| 2009/0007056 A1 | 1/2009 | Prigge et al. |
| 2009/0007081 A1* | 1/2009 | Lau .................. G06F 8/51 717/136 |
| 2009/0043762 A1 | 2/2009 | Shiverick et al. |
| 2009/0055487 A1 | 2/2009 | Moraes et al. |
| 2009/0083275 A1 | 3/2009 | Jacob et al. |
| 2009/0094217 A1 | 4/2009 | Dettinger et al. |
| 2009/0144747 A1 | 6/2009 | Baker |
| 2009/0161147 A1 | 6/2009 | Klave |
| 2009/0172674 A1 | 7/2009 | Bobak et al. |
| 2009/0187556 A1 | 7/2009 | Ross et al. |
| 2009/0193012 A1 | 7/2009 | Williams |
| 2009/0199047 A1 | 8/2009 | Vaitheeswaran et al. |
| 2009/0248721 A1 | 10/2009 | Burton et al. |
| 2009/0282068 A1 | 11/2009 | Shockro et al. |
| 2009/0299830 A1 | 12/2009 | West et al. |
| 2010/0011282 A1 | 1/2010 | Dollard et al. |
| 2010/0070464 A1 | 3/2010 | Aymeloglu et al. |
| 2010/0073315 A1 | 3/2010 | Lee et al. |
| 2010/0082671 A1 | 4/2010 | Li et al. |
| 2010/0145902 A1 | 6/2010 | Boyan et al. |
| 2010/0161646 A1 | 6/2010 | Ceballos et al. |
| 2010/0169376 A1 | 7/2010 | Chu |
| 2010/0169405 A1 | 7/2010 | Zhang |
| 2010/0199167 A1 | 8/2010 | Uematsu et al. |
| 2010/0262839 A1* | 10/2010 | Eker ................ G06F 21/14 713/190 |
| 2010/0313119 A1 | 12/2010 | Baldwin et al. |
| 2011/0035396 A1 | 2/2011 | Merz et al. |
| 2011/0041084 A1 | 2/2011 | Karam |
| 2011/0066497 A1 | 3/2011 | Gopinath et al. |

(56) References Cited

U.S. PATENT DOCUMENTS

| | | | |
|---|---|---|---|
| 2011/0067012 A1* | 3/2011 | Eisen | G06F 8/51 |
| | | | 717/140 |
| 2011/0074811 A1 | 3/2011 | Hanson et al. | |
| 2011/0088011 A1* | 4/2011 | Ouali | G06F 8/10 |
| | | | 717/105 |
| 2011/0093490 A1 | 4/2011 | Schindlauer et al. | |
| 2011/0131547 A1 | 6/2011 | Elaasar | |
| 2011/0145401 A1 | 6/2011 | Westlake | |
| 2011/0208822 A1 | 8/2011 | Rathod | |
| 2011/0252282 A1 | 10/2011 | Meek et al. | |
| 2011/0258216 A1 | 10/2011 | Supakkul et al. | |
| 2011/0270871 A1 | 11/2011 | He et al. | |
| 2011/0321008 A1 | 12/2011 | Jhoney et al. | |
| 2012/0005662 A1* | 1/2012 | Ringseth | G06F 8/453 |
| | | | 717/149 |
| 2012/0078595 A1 | 3/2012 | Balandin et al. | |
| 2012/0079462 A1* | 3/2012 | Hriljac | G06F 8/51 |
| | | | 717/136 |
| 2012/0102022 A1 | 4/2012 | Miranker et al. | |
| 2012/0159449 A1 | 6/2012 | Arnold et al. | |
| 2012/0173381 A1 | 7/2012 | Smith | |
| 2012/0174057 A1 | 7/2012 | Narendra et al. | |
| 2012/0188252 A1 | 7/2012 | Law | |
| 2012/0284719 A1 | 11/2012 | Phan et al. | |
| 2013/0024268 A1 | 1/2013 | Manickavelu | |
| 2013/0024731 A1 | 1/2013 | Shochat et al. | |
| 2013/0054551 A1 | 2/2013 | Lange | |
| 2013/0086482 A1 | 4/2013 | Parsons | |
| 2013/0096968 A1 | 4/2013 | Van Pelt et al. | |
| 2013/0152047 A1 | 6/2013 | Moorthi et al. | |
| 2013/0198624 A1 | 8/2013 | Aymeloglu et al. | |
| 2013/0225212 A1 | 8/2013 | Khan | |
| 2013/0226944 A1 | 8/2013 | Baid et al. | |
| 2013/0232220 A1 | 9/2013 | Sampson | |
| 2014/0012886 A1 | 1/2014 | Downing et al. | |
| 2014/0074888 A1 | 3/2014 | Potter et al. | |
| 2014/0101641 A1* | 4/2014 | Staples | G06F 8/456 |
| | | | 717/130 |
| 2014/0108074 A1 | 4/2014 | Miller et al. | |
| 2014/0115589 A1 | 4/2014 | Marinelli, III et al. | |
| 2014/0115610 A1 | 4/2014 | Marinelli, III et al. | |
| 2014/0214579 A1 | 7/2014 | Shen et al. | |
| 2014/0244388 A1 | 8/2014 | Manouchehri et al. | |
| 2014/0282625 A1* | 9/2014 | Chico de Guzman Huerta | |
| | | | G06F 9/547 |
| | | | 719/320 |
| 2015/0112641 A1 | 4/2015 | Faraj | |
| 2015/0269030 A1 | 9/2015 | Fisher et al. | |
| 2015/0363294 A1* | 12/2015 | Carback, III | G06F 8/37 |
| | | | 717/132 |
| 2016/0026923 A1 | 1/2016 | Erenrich et al. | |
| 2016/0344745 A1* | 11/2016 | Johnson | H04L 67/34 |
| 2017/0039253 A1* | 2/2017 | Bond | G06F 17/30958 |
| 2017/0090893 A1* | 3/2017 | Aditya | G06F 8/51 |
| 2017/0139952 A1* | 5/2017 | Arasan | G06F 17/30194 |
| 2017/0220334 A1* | 8/2017 | Hart | G06F 8/65 |
| 2018/0101583 A1* | 4/2018 | Li | G06F 17/30589 |
| 2018/0150528 A1* | 5/2018 | Shah | G06F 17/30589 |
| 2018/0150529 A1* | 5/2018 | McPherson | G06F 17/30563 |
| 2018/0167480 A1* | 6/2018 | Jain | H04L 67/2828 |

FOREIGN PATENT DOCUMENTS

| | | |
|---|---|---|
| EP | 2 634 745 | 9/2013 |
| EP | 2743839 | 6/2014 |
| EP | 2778986 | 9/2014 |
| EP | 2921975 | 9/2015 |
| GB | 2366498 | 3/2002 |
| GB | 2508503 | 1/2015 |
| GB | 2508293 | 4/2015 |
| HK | 1194178 | 9/2015 |
| NZ | 622485 | 3/2015 |
| NZ | 616212 | 5/2015 |
| NZ | 616299 | 7/2015 |
| WO | WO 2000/034895 | 6/2000 |
| WO | WO 2010/030917 | 3/2010 |
| WO | WO 2013/030595 | 3/2013 |

OTHER PUBLICATIONS

Canese et al., "Chapter 2: PubMed: The Bibliographic Database," The NCBI Handbook, Oct. 2002, pp. 1-10.
Ballesteros et al., "Batching: A Design Pattern for Efficient and Flexible Client/Server Interaction," Transactions on Pattern Languages of Programming, Springer Berlin Heildeberg, 2009, pp. 48-66.
Sirotkin et al., "Chapter 13: The Processing of Biological Sequence Data at NCBI," The NCBI Handbook, Oct. 2002, pp. 1-11.
Han et al., "Efficient Computation of Iceberg Cubes with Complex Measures," ACM Sigmod, May 21-24, 2001, pp. 1-12.
Smart et al., "A Visual Approach to Semantic Query Design Using a Web-Based Graphical Query Designer," 16th International Conference on Knowledge Engineering and Knowledge Management (EKAW 2008),ÊAcitrezza, Catania, Italy, Sep. 29-Oct. 3, 2008, pp. 16.
Delcher et al., "Identifying Bacterial Genes and Endosymbiont DNA with Glimmer," BioInformatics, vol. 23, No. 6, 2007, pp. 673-679.
Mendes et al., "TcruziKB: Enabling Complex Queries for Genomic Data Exploration," IEEE International Conference on Semantic Computing, Aug. 2008, pp. 432-439.
Alur et al., "Chapter 2: IBM InfoSphere DataStage Stages," IBM InfoSphere DataStage Data Flow and Job Design, Jul. 1, 2008, pp. 35-137.
Mizrachi, Ilene, "Chapter 1: GenBank: The Nuckeotide Sequence Database," The NCBI Handbook, Oct. 2002, pp. 1-14.
"A Tour of Pinboard," <http://pinboard.in/tour> as printed May 15, 2014 in 6 pages.
Goldstein et al., "Stacks Lazy Threads: Implementing a Fast Parallel Call," Journal of Parallel and Distributed Computing, Jan. 1, 1996, pp. 5-20.
Liu et al., "Methods for Mining Frequent Items in Data Streams: An Overview," Knowledge and Information Systems, vol. 26, No. 1, Jan. 2011, pp. 1-30.
Wikipedia, "Machine Code", p. 1-5, printed Aug. 11, 2014.
Kitts, Paul, "Chapter 14: Genome Assembly and Annotation Process," The NCBI Handbook, Oct. 2002, pp. 1-21.
"A Quick Guide to UniProtKB Swiss-Prot & TrEMBL," Sep. 2011, pp. 2.
Bogle, Phillip Lee, "Reducing Cross-Domain Call Overhead Using Batched Futures," May 1994, Massachusetts Institute of Technology, pp. 96.
Anonymous, "Frequently Asked Questions about Office Binder 97," http://web.archive.org.web/20100210112922/http://support.microsoft.com/kb/843147 printed Dec. 18, 2006 in 5 pages.
"The FASTA Program Package," fasta-36.3.4, Mar. 25, 2011, pp. 29.
Russell et al., "NITELIGHT: A Graphical Tool for Semantic Query Construction," 2008, pp. 10.
Karp et al., "A Simple Algorithm for Finding Frequent Elements in Streams and Bags," ACM Transactions on Database Systems, vol. 28, No. 1, Mar. 2003, pp. 51Ð55.
Stamos et al., "Remote Evaluation," Journal ACM Transactions on Programming Languages and Systems (TOPLAS) vol. 12, Issue 4, Oct. 1990, pp. 537-564.
Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.
Bae et al., "Partitioning Algorithms for the Computation of Average Iceberg Queries," DaWaK 2000, LNCS 1874, pp. 276_286.
Wollrath et al., "A Distributed Object Model for the Java System," Proceedings of the 2nd Conference on USENEX, Conference on Object-Oriented Technologies (COOTS), Jun. 17, 1996, pp. 219-231.

(56) References Cited

OTHER PUBLICATIONS

Madden, Tom, "Chapter 16: The BLAST Sequence Analysis Tool," The NCBI Handbook, Oct. 2002, pp. 1-15.

Fang et al., "Computing Iceberg Queries Efficiently," Proceedings of the 24th VLDB Conference New York, 1998, pp. 299-310.

Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.

Donjerkovic et al., "Probabilistic Optimization of Top N Queries," Proceedings of the 25th VLDB Conference, Edinburgh, Scotland, 1999, pp. 411-422.

Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.

Ivanova et al., "An Architecture for Recycling Intermediates in a Column-Store," Proceedings of the 35th Sigmod International Conference on Management of Data, Sigmod '09, Jun. 29, 2009, p. 309.

Leela et al., "On Incorporating Iceberg Queries in Query Processors," Technical Report, TR-2002-01, Database Systems for Advanced Applications Lecture Notes in Computer Science, 2004, vol. 2973.

Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.

Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.

Delicious, <http://delicious.com/> as printed May 15, 2014 in 1 page.

Frantisek et al., "An Architectural View of Distributed Objects and Components in CORBA, Java RMI and COM/DCOM," Software—Concepts & Tools, vol. 19, No. 1, Jun. 1, 1998, pp. 14-28.

"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html.

Sigrist, et al., "PROSITE, a Protein Domain Database for Functional Characterization and Annotation," Nucleic Acids Research, 2010, vol. 38, pp. D161-D166.

\* cited by examiner

EXTENSIBLE DATA TRANSFORMATION AUTHORING AND VALIDATION SYSTEM

CROSS-REFERENCE TO RELATED APPLICATIONS; BENEFIT CLAIM

This application claims the benefit of U.S. Provisional Patent Application No. 62/433,569, filed Dec. 13, 2016, the entire contents of which is hereby incorporated by reference as if fully set forth herein, under 35 U.S.C. § 119(e). The applicant(s) hereby rescind any disclaimer of claim scope in the parent application(s) or the prosecution history thereof and advise the USPTO that the claims in this application may be broader than any claim in the parent application(s).

TECHNICAL FIELD

The technical field of the present disclosure generally relates to computer-implemented data analytics systems. More specifically, the disclosure relates to a distributed data analytics system programmed for ease of extensibility and deployment of feature enhancements.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many large-scale data analytics systems are designed to efficiently run large-scale data transformation jobs. Such large-scale data analytics systems apply transformations to one or more input datasets to generate one or more output datasets. Such data analytics systems include multiple subsystems that are tightly coupled, making it difficult to add new transformation features, as changes to support such features need to be made across many subsystems. For example, expanding existing workflows to support a new coding language will require making changes to many tightly coupled subsystems. Furthermore, transformations may operate on data that is subject to security restrictions. Developers may wish to author transformations in any of several programming languages. Auditors may wish to track the origin of columns in transformation output and yet with current systems it is difficult to know which transformation or elements thereof contributed to particular output columns in an output dataset. Thus, there is a need for a distributed data analytics system that allows for efficient development and deployment of new features to one or more subsystems without having to make changes to all subsystems.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which.

Figure 1:
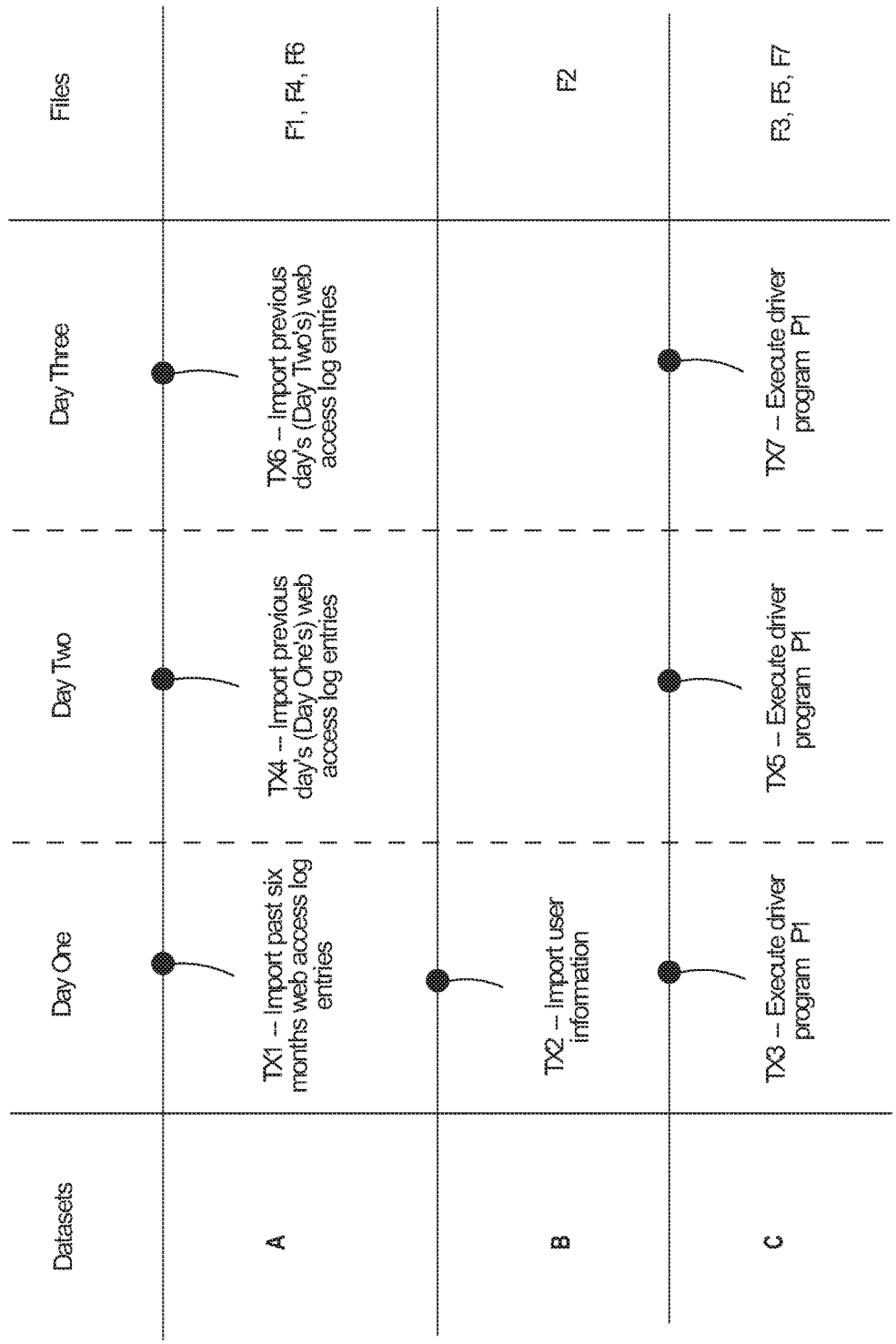
FIG. 1 illustrates dataset versioning according to one example.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1.0 GENERAL OVERVIEW
2.0 EXAMPLE COMPUTER SYSTEM IMPLEMENTATION
  2.1 CODE REPOSITORY
  2.2 AUTOMATED BUILD SYSTEM
  2.3 ARTIFACT REPOSITORY
  2.4 BUILD SERVICE
  2.5 TRANSFORM WORKER
  2.6 MODULE LAUNCHER
  2.7 APPLICATION MODULE
  2.8 CLIENT DEVICE
3.0 EXAMPLE FEATURE DEPLOYMENT
  3.1 SECURITY PERMISSIONS
  3.2 DATASET PROVENANCE
  3.3 SHRINKWRAP
  3.4 NEW LANGUAGE SUPPORT
  3.5 DATASET CACHING
  3.6 ARTIFACT DEPENDENCY CACHING
  3.7 VALIDATION AND TESTING
  3.8 INLINING
  3.9 PYTHON-BASED IMPLEMENTATION
  3.10 JVM-BASED IMPLEMENTATION
4.0 EXAMPLE PROCESS AND ALGORITHM
5.0 IMPLEMENTATION MECHANISMS—HARDWARE OVERVIEW
6.0 IMPLEMENTATION MECHANISMS—SOFTWARE OVERVIEW
7.0 OTHER ASPECTS OF DISCLOSURE 1.0 General Overview Techniques for data transformation in a distributed system of applications and data repositories are described. The subsystems for the overall framework are distributed, thereby allowing for customization to require only isolated changes to one or more subsystems, instead of to all subsystems. In one embodiment, a source code repository is used to receive and digitally store source code. A build subsystem can retrieve source code from the source code repository and build it, using one or more criteria. By building the source code, the build subsystem can generate an artifact, which is executable code, such as a JAR or SQL file. Likewise, by building the source code, the build subsystem can generate one or more job specifications for executing the executable code. In one embodiment, the artifact and job specification may be used to launch an application server in a cluster. The application server can then receive data transformation instructions and execute the data transformation instructions.

The present system provides an extensible framework that can be easily customized with new features. New features can be implemented in a single subsystem or a handful of subsystems without requiring updates to all subsystems of the overall data transformation system. Examples of new features include support for new coding languages. The system provides common security, testing, and configuration mechanisms that work with multiple different source programming languages. The system creates and stores metadata useful in tracking dataset provenance for columns of data in datasets that result from transforms. Improved security for the execution of transformation code is provided so that interactions with secure datasets do not compromise the security policies of that data.

In one embodiment, a data transformation may be specified via a function in a Python coding language. Python is desirable because existing Python libraries provide rich support for data transformation functionality. The Python function itself provides a sequence of instructions for a dataset transformation. A Python decorator that corresponds to the function may be used to specify one or more metaprogramming dependencies, such as dependent datasets, necessary for the execution of the function. Thus, the decorator may be used to retrieve dependent datasets that are necessary for the execution of the function when a command is received to execute a data transformation using the function.

2.0 Example Computer System Implementation

A dataset may be defined as a collection of data. A dataset may include multiple versions that describe the content of the dataset at different points in time. Thus, by looking at a different version of the dataset, it is possible to understand the state of the data of that dataset at a particular point in time. A dataset may include one or more transactions that modify the state of the data in the dataset at different versions. For example, a transaction may add new data files to a dataset, overwrite existing data files in a dataset, or delete data files in a dataset.

For example, FIG. 1 illustrates dataset versioning according to one example. On Day One, an initial version of dataset A is created in the context of transaction TX1 resulting in data file F1. For example, data file F1 may contain web access log entries for the past six months. Also on Day One, an initial version of dataset B is created in the context of transaction TX2 resulting in data file F2. For example, data file F2 may contain rows corresponding to users of an online web service and associating user name identifiers with network addresses from which the users access the web service. Also on Day One, a driver program P1 is executed in the context of transaction TX3 that performs a join based on network address between dataset A, consisting of the initial version of dataset A, and dataset B, consisting of the initial version of dataset B. This execution results in an initial version of dataset C and data file F3 containing the results of the join operation executed in the context of transaction TX3.

On Day Two, the previous day's (i.e., Day One's) web access log entries are added to dataset A in the context of transaction TX4 thereby producing data file F4. In this example, data file F4 contains only the previous day's (i.e., Day One's) web access log entries. Also on Day Two, the driver program P1 is executed again in the context of transaction TX5. In this example, the join performed in the context of transaction TX5 is between the web access log entries in data file F4 and the entries in data file F2. This execution results in a second version of dataset C and data file F5 containing the results of the join operation executed in the context of transaction TX5.

Similarly, on Day Three, the previous day's (i.e., Day Two's) web access log entries are added to dataset A in the context of transaction TX6 and resulting in data file F6. In this example, data file F6 contains only the previous day's (i.e., Day Two's) web access log entries. Also on Day Two, the driver program P1 is executed again in the context of transaction TX7. In this example, the join performed in the context of transaction TX7 is between the web access log entries in data file F6 and the entries in data file F2. This execution results in a third version of dataset C and data file F7 containing the results of the join operation executed in the context of transaction TX7. As a result, there are three versions of dataset A corresponding to transactions TX1, TX4, and TX6 and data files F1, F4, and F6. There is one version of dataset B corresponding to transaction TX2 and data file F2. And there are three versions of dataset C corresponding to transactions TX3, TX5, and TX7 and data files F3, F5, and F7.

A data transformation job is a unit of work that can be executed to perform the computation of a new dataset or a new version of an existing dataset. In some embodiments, a data transformation job computes one or more output datasets from the data of a set of input datasets. Thus, a data transformation job may take one or more input datasets, perform data transformation processing on those input datasets, and generate one or more output datasets. The output datasets may be a new version of an existing dataset or a new dataset altogether.

Figure 2:
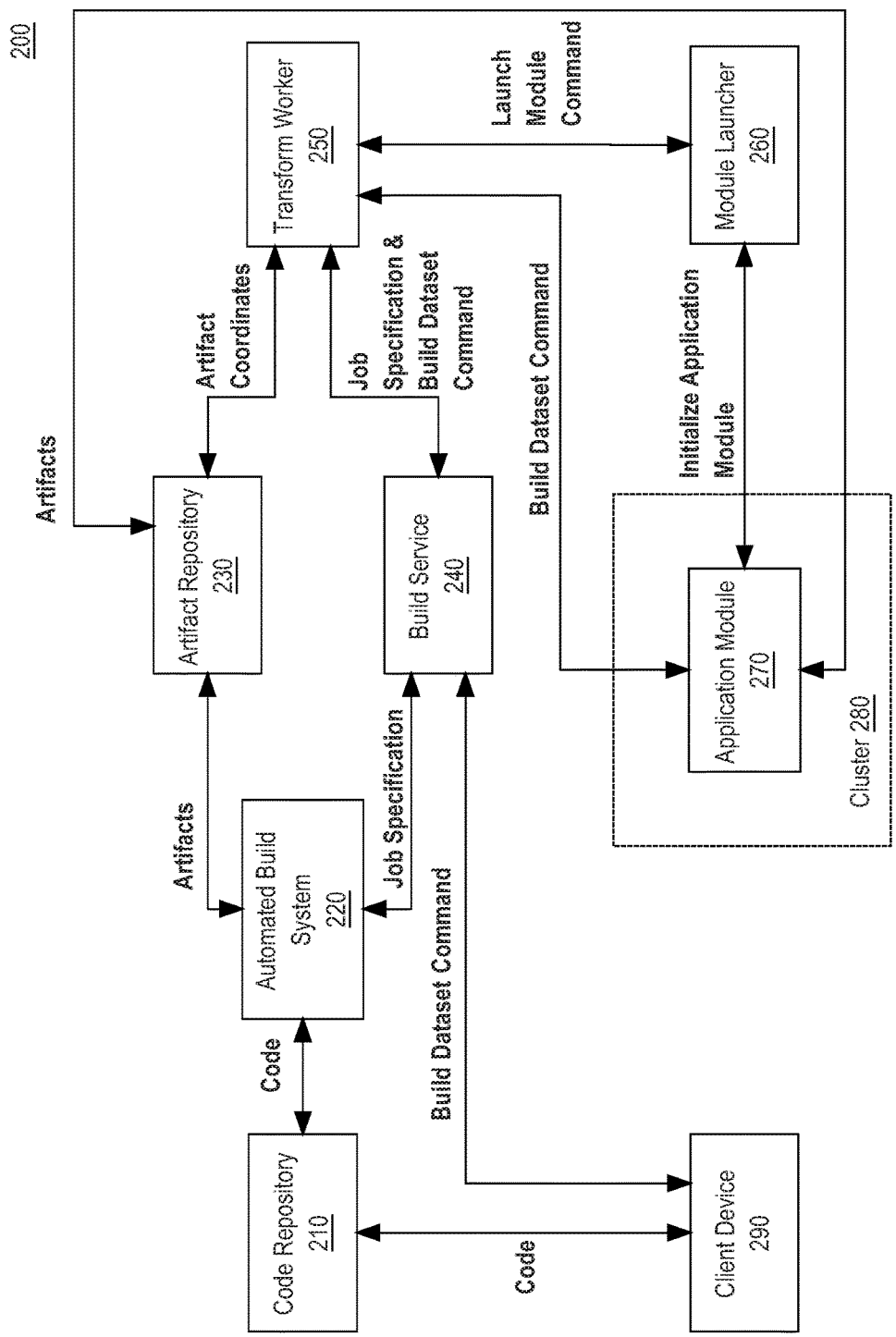
FIG. 2 is a block diagram of an example data analytics system, according to one embodiment.

FIG. 2 illustrates an example block diagram of a data analytics system 200 in which the techniques described herein may be practiced, according to some embodiments. In the example of FIG. 2, data analytics system 200 is a system configured or programmed to perform data transformations. The various components of data analytics system 200 are implemented, at least partially, by hardware at one or more computing devices, such as one or more hardware processors executing stored program instructions stored in one or more memories for performing the functions that are described herein. In other words, all functions described herein are intended to indicate operations that are performed using programming a special-purpose computer or general-purpose computer, in various embodiments. Data analytics system 200 illustrates only one of many possible arrangements of components configured to executing the programming described herein. Other arrangements may include fewer or different components, and the division of work between the components may vary depending on the arrangement.

2.1 Code Repository

Data analytics system 200 includes a code repository 210. Code repository 210 is programmed or configured to serve as an archive for storing, managing, and accessing source code. Thus, code repository 210 can be used for digitally storing source code for a computer program. For example, in one embodiment, code repository 210 may be programmed or configured to allow for the checking in, checking out, committing, merging, branching, forking, or other management of source code files. Source code files can be in any programming language, including, but not limited to Java, Structured Query Language (SQL), Python, Scala, etc. Code repository 210 may be programmed or configured to provide version control for source code files. In one embodiment, code repository 210 may be accessible via a web interface and/or a command line interface. In one embodiment, code repository 210 may be implemented as a Git repository.

In one embodiment, code repository 210 may be communicatively coupled to client device 290 and/or automated build system 220. Thus, a user can use client device 290 to commit source code to code repository 210.

2.2 Automated Build System

Data analytics system 200 may further include an automated build system 220. Automated build system 220 is programmed or configured to retrieve source code from code repository 210. Automated build system 220 is further programmed or configured to compile and build that source code into one or more artifacts and/or one or more job specifications. In one embodiment, automated build system 220 may implemented as a Gradle build system.

In one embodiment, automated build system 220 may be configured via one or more build tasks. A build task is a sequence of instructions that provides criteria for building source code retrieved from code repository 210. A build task may include various criteria, including, but not limited to, a schedule for building source code, an identification of what source code should be retrieved and built, one or more libraries or plugins to use in the build process or include in an artifact, an identification of a location or path of an artifact repository 230 and/or build service 240 that the automated build system 220 should send the built code to. In one embodiment, different build tasks may be used for different types of source code, such as source code of different programming languages.

In one embodiment, automated build system 220 may be accessible via a user interface, such as an application, a web interface, or a command line interface.

The output of automated build system 220 retrieving, compiling, and building source code files from code repository 210 may include one or more artifacts and/or one or more job specifications.

An artifact is a set of executable code, such as a JAR file, a SQL file, an executable file (.EXE), library, plugin, or any other form of executable code.

A job specification is a set of instructions that specifies how to construct a data transformation job. For example, a job specification may include instructions for detailing necessary dataset dependencies for a data transformation job. These dataset dependencies that are included in the job specification may include a unique identifier that identifies dataset dependencies, a path to a dataset that is necessary for the performance of a data transformation job, a data transformation job dependency that indicates a prior job that needs to be completed before the present job can be processed, and/or a subset of data from a dataset, such as a particular version of a dataset to use in the data transformation job. A job specification may further include instructions that indicate a job type that specifies the type of transform worker 250 to use to run a data transformation job. For example, a job type may specify a particular programming language and/or a particular transform worker 250 capable of handling that programming language. A job specification may further include various user-defined configuration settings for running a data transformation job, such as when to execute the data transformation job, where to output the output dataset for the data transformation job, the permission settings for the user that is attempting to execute the data transformation job, etc.

Automated build system 220 may be communicatively coupled to artifact repository 230 and/or build service 240. In one embodiment, automated build system 220 may send any artifacts that it builds to artifact repository 230. In one embodiment, automated build system 220 may send any job specifications it builds to build service 240.

2.3 Artifact Repository

Data analytics system 200 may further include artifact repository 230. Artifact repository 230 is a data storage system that is programmed or configured to serve as an archive for storing, managing, and accessing artifacts. In one embodiment, artifact repository 230 is a blobstore.

Artifact repository 230 may be programmed or configured to provide version control for artifacts. In one embodiment, artifact repository 230 may be accessible via a web interface and/or a command line interface. In one embodiment, artifact repository 230 may be communicatively coupled to transform worker 250.

In one embodiment, artifact repository 230 may be programmed or configured to periodically retrieve artifacts from automated build system 220 according to a schedule or configuration setting.

Storing artifacts in artifact repository 230 provides various security advantages. For example, downstream systems do not have access to the underlying source code and only have access to fully built artifacts. This can help to ensure that downstream systems, and user accounts that have access to downstream systems, cannot access or modify the raw source code files in code repository 210. Furthermore, by storing an artifact in artifact repository 230, the artifact will be fully built and ready to use for subsequent build dataset commands that require the artifact, without having to rebuild the artifact, assuming no changes to the underlying source code are made. Therefore, data transformation jobs can be efficiently processed using existing artifacts in artifact repository 230, without having to rebuild the same artifact over and over between data transformation jobs.

2.4 Build Service

Data analytics system 200 may further include build service 240 that is programmed or configured to manage a data transformation job. Build service 240 may be implemented as an executable program, process or thread that is defined by stored program instructions in the system 200. Build service 240 may be communicatively coupled to automated build system 220 and receive a job specification from automated build system 220.

Build service 240 may further be communicatively coupled to client device 290. For example, client device 290 may send various commands to build service 240 via an interface, such as a web interface, command line interface, or application programming interface (API). In one embodiment, client device 290 may be configured to send a build dataset command to a build service 240. A build dataset command is a sequence of data transformation instructions to initiate a data transformation job to either build a new dataset or build a new version of an existing dataset. In one embodiment, the data transformation instructions specify a process or parameters for a build transformation job.

In one embodiment, build service 240 does not actually perform any data transformation job itself, instead, it invokes a registered transform worker 250 to perform the data transformation job. In one embodiment, build service 240 is communicatively coupled to one or more transform workers 250. Although depicted in FIG. 2 as a single transform worker 250, in one embodiment, multiple transform workers 250 may exist. In one embodiment, different transform workers 250 may exist for different job types. For example, a first transform worker 250 may be used for data transformation jobs that use SQL, and a second transform worker 250 may be used for data transformation jobs that use another programming language, such as Java.

In one embodiment, once build service 240 receives a build dataset command and job specification, build service 240 identifies the appropriate transform worker 250 to perform the data transformation job, based on the job specification. For example, build service 240 may store mapping data that maps a job type of a job specification to a particular transform worker 250. Build service 240 then sends a build dataset command and the job specification to the identified transform worker 250 for execution. In one embodiment, build service 240 may communicate with transform worker 250 via a Hypertext Transfer Protocol (HTTP) and/or JavaScript Object Notation (JSON) API.

In one embodiment, build service 240 may receive job status information from transform worker 250 about the status of a data transformation job. In one embodiment, status information may include one or more of the following:

- WAITING—The initial state of a data transformation job when the data transformation job is waiting for dependent jobs to complete and has not be invoked by a transform worker 250 yet.
- RUN_PENDING—The build service 240 considers the data transformation job running, but the transform worker 250 has not confirmed the status yet.
- RUNNING—The data transformation job has been invoked by the transform worker 250 and is currently being computed.
- ABORT_PENDING—The build service 240 considers the data transformation job aborted, but the transform worker 250 has not confirmed the abortion yet.
- ABORTED—The data transformation job was aborted, either based on user request or as a request of a dependent job failing or being aborted.
- FAILED—the data transformation job was invoked by the transform worker 250, but the computation failed and the transform worker 250 indicated the failure to the build service 240.
- COMPLETED—the data transformation job was invoked by the transform worker 250, and the computation finished successfully.

In one embodiment, build service 240 may make status information available to a client device 290 to allow a user to view the status of a data transformation job for which a build dataset command was sent.

2.5 Transform Worker

Transform worker 250 is programmed or configured to invoke a data transformation job. Transform worker 250 may be implemented as an executable program, process or thread that is defined by stored program instructions in the system 200. In one embodiment, multiple transform workers 250 may exist. For example, different transform workers 240 may be used to invoke data transformation jobs having different job types.

A transform worker 250 invokes a data transformation job by launching an application module 270, via module launcher 260, and executing the data transformation job via that application module 270.

In an embodiment, transform worker 250 sends a request or command to module launcher 260 to launch an application module for the data transformation job. The request from transform worker 250 may include the job specification and/or the coordinates for one or more necessary artifacts for the data transformation job. The coordinates may identify a particular artifact or location of an artifact in artifact repository 230. Module launcher may then launch an application module 270.

Once the application module 270 is launched by module launcher 260, transform worker 250 can then send a build dataset command directly to application module 270 in order to cause application module 270 to retrieve the necessary artifacts from the artifact repository and execute the data transformation job. For example, in one embodiment, either the launch module command and/or the build dataset command may include coordinates that identify one or more artifacts in artifact repository 230. Thus, upon receiving a job specification and a build dataset command from build service 240, transform worker 250 causes module launcher 260 to retrieve the necessary artifacts to build the dataset from artifact repository 230 for the execution of the data transformation job. In one embodiment, the necessary artifacts or artifact coordinates may be specified in the job specification. Transform worker 250 then sends a request or command to module launcher 260 to launch an application module for the data transformation job. The request from transform worker 250 may include the job specification and/or the artifact coordinates. The application module 270, once launched, will retrieve the necessary artifacts from artifact repository 230 based on the coordinates received from transform worker 250.

Application module 270 can send status information regarding the execution of the data transformation job to transform worker 250, which can, in turn, relay that status information to build service 240.

2.6 Module Launcher

Module launcher 260 is an application server that is programmed or configured to receive a launch module command from transform worker 250. In response to receiving a launch module command from transform worker 250, module launcher 260 initializes an application module 270 in cluster 280. Module launcher 260 is not involved in the actual data transformation job processing, but rather, merely provides a workflow for initializing and starting up an application module 270 that can handle data transformation job processing.

Upon initializing application module 270, module launcher 260 can be programmed or configured to send a response to transform worker 250 that includes a link to application module 270. In one embodiment, the link may be implemented as a Representational State Transfer (REST) API. Thus, the module launcher 260 allows the transform worker 250 to communicate directly to the application module 270, via the link.

In one embodiment, the module launcher 260 may return status information to transform worker 250 regarding the status of the initialization of application module 270. This status information may be related, via build service 240 to client device 290.

2.7 Application Module

Application module 270 is an application server that is programmed or configured to receive data transformation instructions and execute a data transformation job. In one embodiment, application module 270 may be an HTTP server. Application module 270 can be initialized based on a job specification and one or more artifacts stored in artifact repository 230. Application module 270 is communicatively coupled to transform worker 250 via a link, such as a REST API. In one embodiment, application module 270 may receive a build dataset command that includes data transformation instructions from a transform worker 250. Upon receiving a build dataset command from transform worker

250, application module 270 can execute a data transformation job as specified in the build dataset command. In one embodiment, application module 270 may retrieve one or more necessary artifacts from artifact repository 230 based on artifact coordinates received from transform worker 250. The one or more artifacts may be used to execute the data transformation job as specified in the build dataset command. Thus, application module 270 handles the actual processing of the data transformation job. In one embodiment, application module 270 may return status information to transform worker 250 before, during, and/or after the execution of a data transformation job regarding the status of the execution of the data transformation instructions.

In one embodiment, application module 270 may be initialized in a cluster 280 with other application modules 270 (not depicted). Thus, a cluster of application modules 270 may exist for different types of data transformation jobs. Cluster 280 may be used for caching shared resources across multiple application modules 270, such as in-memory copies of datasets or cached copies of artifacts. An application module 270 may run indefinitely, thus providing availability for processing particular types of data transformation jobs as required by the transform worker 250.

In one embodiment, a different application module 270 may be initialized in cluster 280 for each supported programming language, such as Java, Python, SQL, etc. This allows different application modules 270 to be responsible for different programming languages. In one embodiment, transform worker 250 stores mapping data that maps a particular one of the application modules 270 to a particular job type, and/or mapping data that maps a particular job type to a particular application module 270, such as by programming language. This allows for the rapid development and deployment of new functionality to support a new programming language on the fly by initializing a new application module 270 for the new programming language.

2.8 Client Device

Data analytics system 200 may include a client device 290. Client device 290 may be implemented across one or more computing devices, such as a mobile computing device, tablet computer, desktop computer, or laptop computer, none of which is intended as generic, since it is loaded with instructions in a new ordered combination as otherwise disclosed herein to implement the functions and algorithms of this disclosure. Client device 290 may be accessible to a user and may provide a user interface for a user to access code repository 210 and/or build service 240 of data analytics system 200. The user interface may be provided via an application, a web service, a command line interface, or some other graphical display. Client device 290 is coupled to code repository 210 and/or build service 240. For example, client device 290 may be communicatively coupled to code repository 210 and/or build service 240 via a network, such as the Internet or a private network.

Client device 240 may be programmed or configured to commit, merge, branch, fork, check in, check out or perform other interactions with code repository 210. Client device 290 may be programmed or configured to send a build dataset command to build service 240 that includes one or more dataset transformation instructions. Client device 290 may be programmed or configured to receive information from build service 240, such as status information on data transformation jobs, and display that information via a user interface to allow a user to view the status of a data transformation job.

3.0 Example Feature Deployment

The present system provides an extensible framework that can be easily customized with new features. New features can be implemented in a single subsystem or a small subset of subsystems of data analytics system 200 without requiring updates to all subsystems. Examples of new features are described below, but other features may be easily added to data analytics system 200 with minimal changes to the overall architecture.

3.1 Security Permissions

One risk of a data analytics system is that a user that has permission to author or modify source code that is used in a data transformation job and execute that source code can potentially access sensitive data on the computing device(s) where the data transformation job is executed. Such sensitive data can be data that needs to be secure from malicious users or data that, if modified, may affect data integrity as a whole for the data analytics system. The present system may provide improved security by segregating security permissions for committing source code to code repository 210 from the security permissions for executing a build dataset command on build service 240. Thus, some users may have access to committing source code that will be used in a data transformation job, but those users may be denied access from actually performing a data transformation job via a build dataset command. By segregating these permissions away from the users that are committing source code, a second set of users can oversee and verify the committed source code before actually executing a data transformation job via a build dataset command. Such a feature can be added at the code repository 210 and build service 240 subsystems without a need for global changes across more subsystems.

3.2 Dataset Provenance

Datasets can include multiple versions of information over multiple transactions, and the dataset versions can be generated based on multiple dataset inputs. Over time, it can be challenging to identify the provenance of the original source of where data in a dataset originated. The present system provides for easy extensibility to add dataset provenance tracking to datasets.

3.3 Shrinkwrap

In one embodiment, certain data in a dataset may be sensitive information. For example, if a dataset contains data files that specify social security numbers, the social security number data in the dataset may be sensitive. Whenever a dataset with such sensitive information is processed using a dataset transformation job, the data related to such sensitive information may need to be obfuscated to preserve the sensitive information.

In one embodiment, a shrinkwrap library can be included as part of build task for the inclusion in libraries and/or job specifications. The shrinkwrap library is a customized library that can be used for the secure obfuscation of sensitive data, for example, with a hashing function. In a traditional data analytics system, such a shrinkwrap library functionality would need to be included in every source code commit for any dataset transformation job. However, in the present system, such a shrinkwrap library can be easily added to all data transformation jobs. The shrinkwrap library can be added to the automated build system 220 and referenced via a set of build task criteria. Then, when the automated build system 220 builds code from a code repository 210 using build task criteria that specifies the shrinkwrap library, the shrinkwrap library functionality can be included in the outputted artifacts and job specifications automatically. This is an example of how a single change at a single subsystem can provide robust features for all data transformation jobs handled by data analytics system 200.

3.4 New Language Support

The present system makes it easy to add support for new programming languages that are to be used in data transformation jobs. A new programming language can be added to the existing data analytics system 200 by defining a new build task that can take the source code of the new programming language and generate artifacts based on source code in the new programming language, as well as updating a configuration setting of the transform worker 250 that maps the new programming language to a new application module 270

3.5 Dataset Caching

Caching datasets across data transformation jobs can be accomplished with the present system. In one embodiment, cluster 280 may include functionality for caching datasets that can be shared across multiple application modules 270.

3.6 Artifact Dependency Caching

If multiple jobs depend on the same artifact, there will be an incurred cost to resolve them every time when executing a data transformation job. In one embodiment, artifacts may be distributed to a cache shared across a cluster 280. Then, application modules 270 can reference artifacts in the cache of cluster 280 instead of referring to the artifacts by coordinates in the artifact repository 230. This will improve uptime, as only those application modules 270 in the same cluster will be competing for the artifacts. Those application modules 270 in a separate cluster will have their own cache of artifacts.

3.7 Validation and Testing

During compilation of source code, various validation can be performed of the source code to ensure that the source code conforms to certain requirements.

3.8 Inlining

In the case of a data transformation job that consists of multiple stages of computation, the computations can be inlined. Inlining comprises running a sequence of instructions without persisting intermediate computation results to disk. Inlining can be challenging to achieve when computations are performed across languages, where the computed output from one computation cannot be referenced in the language of another computation.

3.9 Python-Based Implementation

In an embodiment, a Python-based implementation of data analytics system 200 may be used. In a Python-based implementation, transform worker 250 may be implemented as a Python server. Likewise, code submitted to code repository 210 may be coded in a Python coding language.

Code may include one or more Python functions which define computational logic for a data transformation job. Thus, by using a Python coding language, the code may be implemented to take advantage of Python syntax, features, and data structures. For example, the code may be implemented to use for-loops, recursion, and similar types of features native to Python. This allows for fully-featured implementation of data transformation jobs using Python coding language features.

Code may further include Python decorators. A Python decorator is an annotation syntax in a Python coding language that can be used for implementing higher-order functions. Specifically, a decorator is a higher-order function that takes a lower-order function as an input and extends the lower-order function without explicitly modifying it. Python decorators can thus be used to define metaprogramming dependencies for functions of computational logic. For example, a lower-order Python function may define a data transformation job that outputs an output dataset and Python decorators can be used to define one or more expected input datasets for the lower-order Python function. The decorators can define, for example, the expected location of the input dataset(s), the expected type of the input dataset(s), the expected content of the input dataset(s), or the expected characteristic(s) of the input datasets. Thus, a Python decorator that corresponds to a function may be utilized to allow users to define, directly via the code, pipeline dependencies for data transformation jobs.

A Python-based implementation of data analytics system 200 provides various benefits. First, Python is a fully featured programming language. Thus, code for data transformation jobs may utilize the existing syntax, features, and data structures of the Python programming language to implement complex data transformation jobs. For example, for-loops, conditional programming, dynamic imports, reflection, and recursion may be implemented in the data transformation jobs. This allows for the implementation of complex data transformation jobs.

Second, Python is widely utilized as a programming language for data science analysis. Thus, by providing a Python-based implementation of code for computational logic in the present data analytics system 200, a user may utilize various Python-specific libraries and tools for data sciences as part of the computational logic of data transformation jobs. Examples of such Python-specific libraries and tools include, but are not limited to: Pandas, NumPy, SciPy, and IPython Notebook.

Third, a Python-based implementation of data analytics system 200 allows users to specify metaprogramming dependencies of input and output datasets via Python decorators. In an embodiment, transform worker 250 can analyze an artifact built from Python code or the underlying code itself to determine metaprogramming dependencies for one or more data transformation jobs. In an embodiment, transform worker 250 is programmed or configured to analyze the Python decorators in the Python code or artifact to identify dataset dependencies for data transformation jobs specified by functions without having to execute the computational logic of the functions themselves. Thus, the transform worker 250 can determine metaprogramming dependencies of the code or artifact. In an embodiment, transform worker 250 can generate a dependency file based on this analysis. This dependency file therefore defines the dataset dependencies for one or more data transformation jobs in a set of code. This dependency file can be used to define a pipeline of data transformations across multiple datasets.

In an embodiment, transform worker 250 is further programmed or configured to use the Python decorators to retrieve one or more dependent datasets necessary for the computation of a data transformation job.

3.10 JVM-Based Implementation

In an embodiment, a Java Virtual Machine (JVM)-based implementation of data analytics system 200 may be used. In a JVM-based implementation, transform worker 250 may be implemented using a JVM. Code submitted to code repository 210 may be coded in a programming language that is compatible with a JVM, such as Java or Scala. Although Java and Scala are two examples of JVM-compatible languages, any language that is compatible with a JVM may be used.

Using Java or Scala for defining data transformation jobs via code in a JVM-based implementation of data analytics system 200 provides various benefits. First, Java and Scala are each strongly-typed programming languages, which, in some cases, can make programming data transformation jobs via code easier. Second, Java and Scala are each object-oriented programming languages, thus, implementing data transformation jobs via Java or Scala allows for code reuse, object encapsulation and abstraction, and polymorphism.

In an embodiment, a JVM-based implementation of data analytics system 200 allows a transform worker 250 to determine whether to recompute a dataset if byte code changes to a data transformation job are detected. For example, assume that code checked into code repository 210 includes computational logic for a data transformation job that is used for computing a first dataset. The code may be built into an artifact stored into artifact repository 230. In an embodiment, when a transform worker 250 retrieves the artifact from artifact repository 230, the transform worker 250 is programmed or configured to determine whether the byte code of data transformation job specified in the artifact has changed from a prior version of the data transformation job. Transform worker 250 is programmed or configured to compare the byte code of the current version of the data transformation job to the byte code of the prior version of the data transformation job. If the transform worker 250 detects that there have been no byte code changes, the transform worker 250 will not recompute the first dataset. However, if the transform worker 250 detects that there have been byte code changes to the data transformation job, the transform worker 250 will recompute the first dataset as the computational logic for the data transformation job has been changed. Thus, transform worker 250 is programmed or configured to dynamically determine whether recomputation of datasets is necessary based on byte code changes to a data transformation job.

4.0 Example Process and Algorithm

Figure 3:
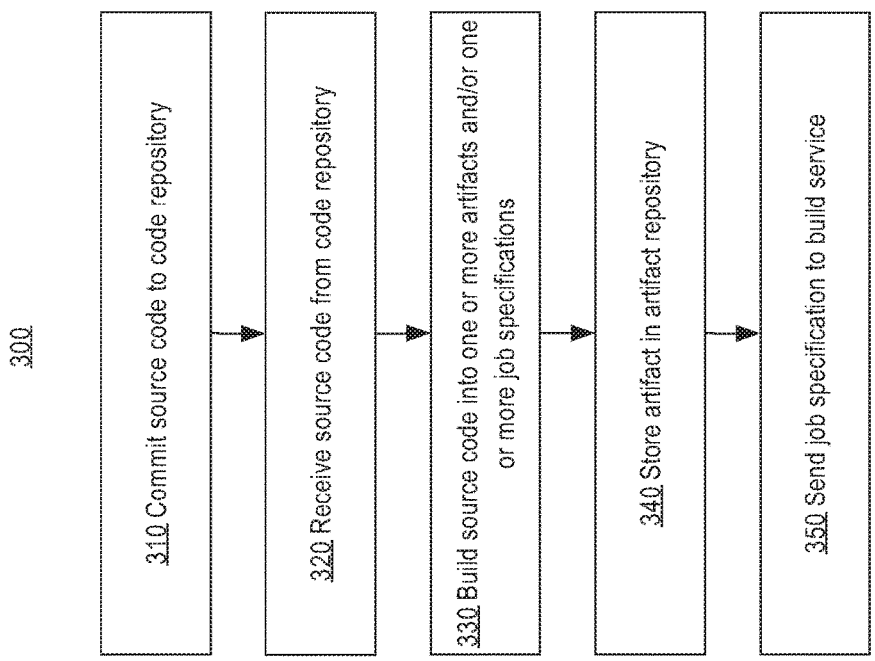
FIG. 3 illustrates a flow diagram performing a build of source code files, according to one embodiment.

FIG. 3 illustrates a flow diagram of an example process 300 for performing a build of source code files, according to one embodiment. FIG. 3, and each other flow diagram in the drawing figures or process description in the text, is intended to disclose an algorithm or functional description that may be used as a basis of writing computer programs to implement the functions that are described herein, and which cause a computer to operate in the new manner that is disclosed herein. Further, FIG. 3 and each other flow diagram or process description are provided to communicate such an algorithm at the same level of detail that is normally used, by persons of skill in the art to which this disclosure is directed, to communicate among themselves about plans, designs, specifications and algorithms for other computer programs of a similar level of complexity.

The process 300 may start at step 310. In step 310, code repository 210 is programmed or configured to receive one or more source code files and commit those source code files. The source code files may be committed in response to a request from client device 290. In one embodiment, committing the source code files may include merging, branching, forking, checking out, and/or checking in source code files. Once the source code files are committed, the process 300 may then proceed to step 320.

In step 320, automated build system 220 is programmed or configured to receive the source code files from code repository 210. In one embodiment, the source code files are pushed by the code repository 210 to the automated build system 220 upon being committed. In one embodiment, automated build system 220 may retrieve the source code files from code repository 210 based on a build task that specifies one or more criteria for retrieving the source code files, such as a build schedule. The build task criteria may include an identification of what source code files to build, how frequently to retrieve the source code files, and where to send the output of the build. Once automated build system 220 receives the source code files from code repository 210, the process 300 may proceed to step 330.

In step 330, the automated build system 220 is programmed or configured to use a build task to build the source code into one or more artifacts and/or one or more job specifications. The build task may specific various criteria for building the source code files, such as when the source code files should be built, what libraries and virtual machine to use for building the source code, configuration settings for the build process, and where the output of the build process should be sent. The build process of the automated build system 220 may generate one or more artifacts, which are executable code, such as JARs, .EXE files, SQL, etc. The build process of the automated build system 220 may generate one or more job specifications that are sequences of instructions for how to construct a data transformation job. The process 300 may then proceed to step 340.

In step 340, the process 300 may store the one or more artifacts generated in step 330 in an artifact repository 230. Artifact repository 230 is a repository for storing executable code. In one embodiment, artifact repository 230 may be implemented as a blobstore. In one embodiment, artifact repository 230 may include coordinates for the location of artifacts stored in the artifact repository 230 to allow transform workers 250 to easily retrieve necessary artifacts.

In step 350, the automated build system 230 is programmed or configured to send the job specification generated in step 330 to build service 240. Build service 240 will later serve as an entry point for the invoking of data transformation jobs, via build dataset commands, and the job specification will be used as criteria for the execution of the data transformation job. The process 300 may then end.

Figure 4:
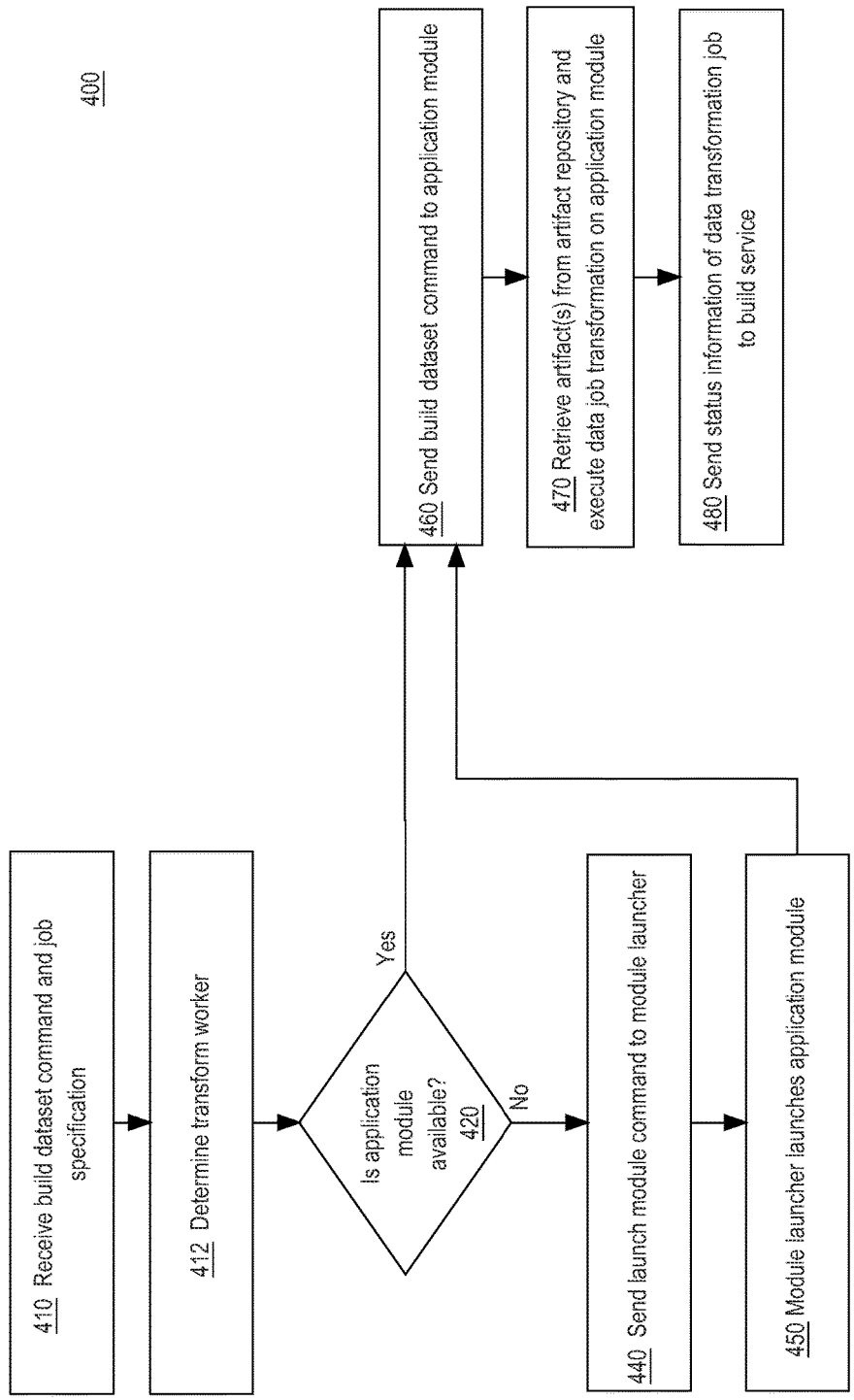
FIG. 4 illustrates a flow diagram of an example process for executing a data transformation job, according to one embodiment.

FIG. 4 illustrates a flow diagram of an example process 400 for executing a data transformation job. The process 400 may start at step 410. At step 410, the build service 240 is programmed or configured to receive a job specification and a build dataset command. The job specification is received from automated build system 220 and includes a set of instructions that specifies how to construct a data transformation job. For example, a job specification may include instructions for detailing necessary dataset dependencies for a data transformation job or additional user-defined configuration settings for a data transformation job. The build dataset command may be received from client device 290. A build dataset command may be any request for the execution of a data transformation job. For example, the build dataset command may be received via a user interface on client device 290, such as an application, web interface, or command line interface. The process 400 may then proceed to step 412.

In step 412, the process 400 determines the appropriate transform worker 250 to handle the data transformation job. For example, in one embodiment, the build service 240 may determine a particular transform worker 250 to handle the data transformation job based on the job type specified in the job specification. In another embodiment, build service 240 may determine a particular transform worker 250 based on the programming language identified in the job specification, as a specific transform worker 250 may be dedicated to a handling jobs of a particular programming language. Once the particular transform worker 250 is identified, the build service 240 may send the job specification and/or a build dataset command to the transform worker 250. The process 400 may then proceed to step 420.

In step 420, the transform worker 250 may determine whether an existing application module 270 is available that can handle the data transformation job or not. For example, in one embodiment, transform worker 250 may maintain a catalogue of available application modules 270 in cluster 280. The catalogue may be maintained by adding new application modules 270 to the catalogue when they are initialized, and removing application modules 270 from the catalogue when they shut down or become unavailable. The catalogue may further contain mapping information that maps particular job types to particular application modules 270. Thus, the transform worker 250 can maintain state information on the availability of application modules 270, as well as the types of data transformation jobs that those application modules 270 can handle. If transform worker 250 determines that there is no application module 270 that is available that can handle the build dataset command, the process 400 may proceed to step 440. If transform worker 250 determines that an application module 270 is available that can handle the build dataset command, the process 400 may proceed to step 460.

In step 440, the transform worker 250 may send a launch module command to module launcher 260. A launch module command may be any request for the initialization of an application module 270 that can be used for handling a data transformation job. In one embodiment, the launch module command may include the job specification or a subset of the job specification. In one embodiment, the launch module command may include the coordinates of the artifacts from the artifact repository 230. In one embodiment, the launch module command may include one or more server settings that are configured by the transform worker, such as settings of when to launch the application module 270, the location of where to launch the application module 270, how long the application module 270 should be available, security settings for the application module 270, or any other configuration related to the lifecycle of the application module 270. The process 400 may then proceed to step 450.

In step 450, the module launcher 260 initializes the application module 270 in cluster 280, based on the launch module command received form the transform worker 250. In one embodiment, the module launcher may return status information regarding the initialization of application module 270 to the transform worker 250. In one embodiment, once application module 270 has successfully completed launching, the module launcher 260 can send a link to transform worker 250 that the transform worker 250 can use to directly communicate with application module 270, such as a REST API URL. The process 400 may then proceed to step 460.

In step 460, the transform worker 250 may send a build dataset command to application module. A build dataset command may be any request for the execution of a data transformation job. The process 400 may then proceed to step 470.

In step 470, the application module 270 receives the build dataset command from transform worker 250, and, in response, retrieves one or more artifacts from the repository and executes the data transformation job. In one embodiment, application module 270 may retrieve one or more artifacts from the artifact repository 230 that are necessary for the data transformation job. For example, in one embodiment, the necessary artifacts may be identified in the job specification via coordinates. In an embodiment, transform worker 250 may include the artifact coordinates as part of either the launch module command of step 440 or the build dataset command of step 460. Application module 270 may then use those coordinates provided by transform worker 250 to retrieve the one or more artifacts from artifact repository 230. The execution of the data transformation job may include the taking one or more input datasets and generating one or more output datasets or a new version of one or more existing datasets. In one embodiment, the execution of the data transformation job may be performed using the artifacts retrieved from the artifact repository 230 and/or the job specification. The process 400 may then proceed to step 480.

In step 480, the application module 270 may send status information of the data transformation job to the transform worker 250. Status information may indicate that the data transformation job was completed, failed, aborted, or any other information regarding the interim processing of the data transformation job. This information can be used by the transform worker 250 to notify build service 240 and/or client device 290 regarding the status of the data transformation job. The process 400 may then end.

Figure 7:
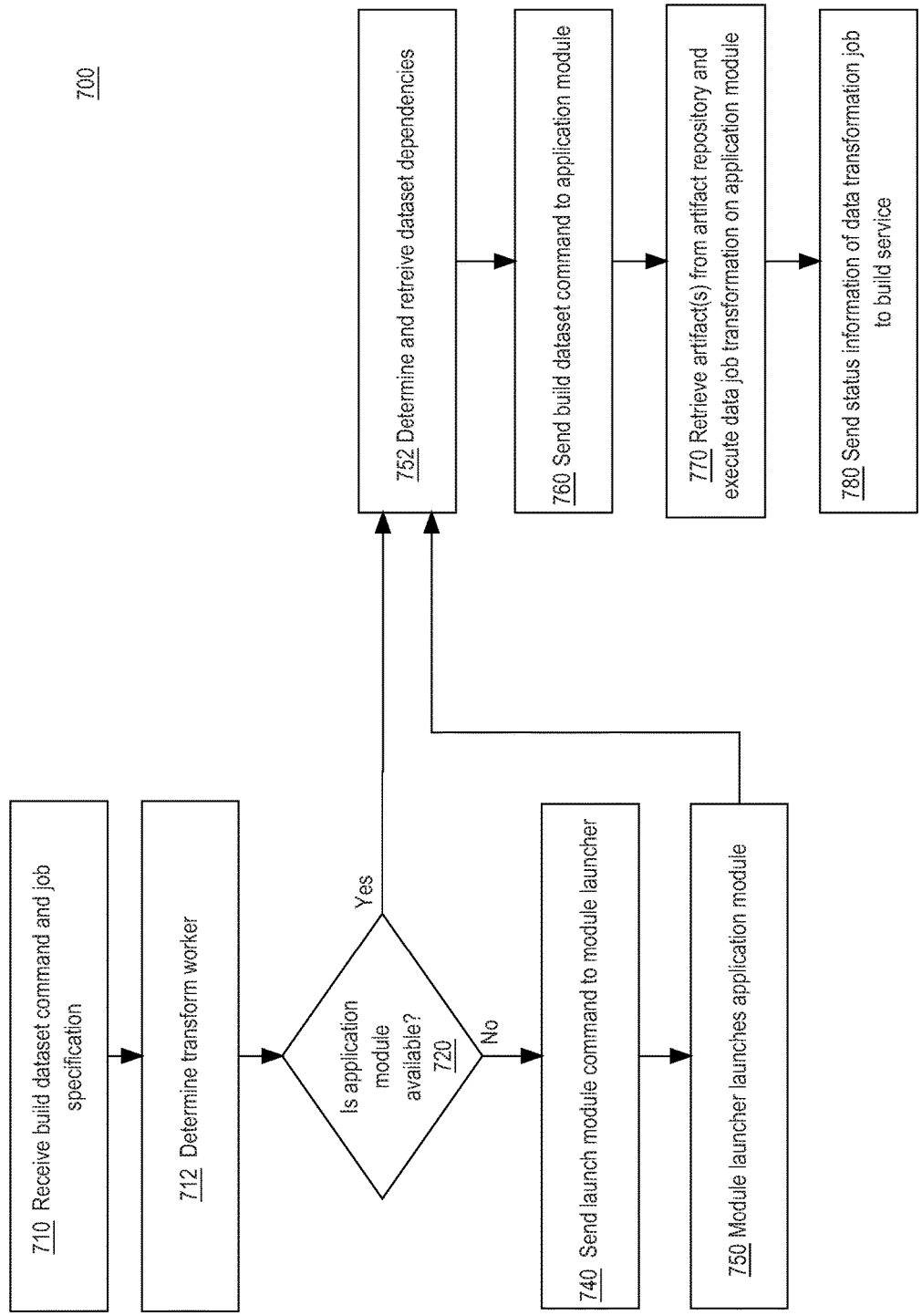
FIG. 7 illustrates a flow diagram of an example process for executing a data transformation job in a Python-based implementation, according to one embodiment.

FIG. 7 illustrates a flow diagram of an example process 700 for executing a data transformation job in a Python-based implementation, according to one embodiment. Process 700 assumes that code in Python coding language has already been committed to code repository 210, built into an artifact, and stored in artifact repository 230, as per the process 300 described earlier. The process 700 may start at step 710. At step 710, the build service 240 is programmed or configured to receive a job specification and a build dataset command. The job specification is received from automated build system 220 and includes a set of instructions that specifies how to construct a data transformation job. For example, a job specification may include instructions for detailing necessary dataset dependencies for a data transformation job or additional user-defined configuration settings for a data transformation job. The build dataset command may be received from client device 290. A build dataset command may be any request for the execution of a data transformation job. For example, the build dataset command may be received via a user interface on client device 290, such as an application, web interface, or command line interface. In an embodiment, the build dataset command may specific one or more Python functions for execution of a data transformation job. The process 700 may then proceed to step 712.

In step 712, the process 400 determines the appropriate transform worker 250 to handle the data transformation job. In this particular example, the transform worker 250 may be a Python-based server. Once the particular transform worker 250 is identified, the build service 240 may send the job specification and/or a build dataset command to the transform worker 250. The process 700 may then proceed to step 720.

In step 720, the transform worker 250 may determine whether an existing application module 270 is available that can handle the data transformation job or not. For example, in one embodiment, transform worker 250 may maintain a catalogue of available application modules 270 in cluster 280. The catalogue may be maintained by adding new application modules 270 to the catalogue when they are initialized, and removing application modules 270 from the catalogue when they shut down or become unavailable. The catalogue may further contain mapping information that maps particular job types to particular application modules 270. Thus, the transform worker 250 can maintain state information on the availability of application modules 270, as well as the types of data transformation jobs that those application modules 270 can handle. If transform worker 250 determines that there is no application module 270 that is available that can handle the build dataset command, the process 700 may proceed to step 740. If transform worker 250 determines that an application module 270 is available that can handle the build dataset command, the process 700 may proceed to step 752.

In step 740, the transform worker 250 may send a launch module command to module launcher 260. A launch module command may be any request for the initialization of an application module 270 that can be used for handling a data transformation job. In one embodiment, the launch module command may include the job specification. In one embodiment, the launch module command may include the artifacts retrieved form the artifact repository 230 or the coordinates of the artifacts from the artifact repository 230. In one embodiment, the launch module command may include one or more server settings that are configured by the transform worker, such as settings of when to launch the application module 270, the location of where to launch the application module 270, how long the application module 270 should be available, security settings for the application module 270, or any other configuration related to the lifecycle of the application module 270. The process 700 may then proceed to step 750.

In step 750, the module launcher 260 initializes the application module 270 in cluster 280, based on the launch module command received form the transform worker 250. In on embodiment, the module launcher may return status information regarding the initialization of application module 270 to the transform worker 250. In one embodiment, once application module 270 has successfully completed launching, the module launcher 260 can send a link to transform worker 250 that the transform worker 250 can use to directly communication with application module 270, such as a REST API link. The process 700 may then proceed to step 752.

In step 752, the transform worker 250 may analyze one or more Python decorators in the code or in the artifact to identify one or more dataset dependencies for the execution of the data transformation job. Dataset dependencies may include one or more expected input datasets, their locations such as relative file path, their expected contents and their expected dataset types. In an embodiment, transform worker 250 may generate a dependency file that identifies the one or more dataset dependencies for the data transformation job. In an embodiment, transform worker 250 may further retrieve the dependent datasets. Thus, transform worker 250 is programmed or configured to determine what dataset dependencies exist and retrieve the necessary datasets for the execution of the data transformation job. The process 700 may then proceed to step 760.

In step 760, the transform worker 250 may send a build dataset command to application module. A build dataset command may be any request for the execution of a data transformation job. In an embodiment, the build dataset command may be packaged with the dataset dependencies, the dependency file, and/or the input datasets retrieved in step 752. The process 700 may then proceed to step 770.

In step 770, the application module 270 receives the build dataset command from transform worker 250, and, in response, retrieves one or more artifacts from the repository and executes the data transformation job. In one embodiment, application module 270 may retrieve one or more artifacts from the artifact repository 230 that are necessary for the data transformation job. For example, in one embodiment, the necessary artifacts may be identified in the job specification via coordinates. In an embodiment, transform worker 250 may include the artifact coordinates as part of either the launch module command of step 740 or the build dataset command of step 760. Application module 270 may then use those coordinates provided by transform worker 250 to retrieve the one or more artifacts from artifact repository 230. The execution of the data transformation job may include the taking one or more input datasets and generating one or more output datasets or a new version of one or more existing datasets. In one embodiment, the execution of the data transformation job may be performed using the artifacts retrieved from the artifact repository 230 and/or the job specification. The process 700 may then proceed to step 780.

In step 780, the application module 270 may send status information of the data transformation job to the transform worker 250. Status information may indicate that the data transformation job was completed, failed, aborted, or any other information regarding the interim processing of the data transformation job. This information can be used by the transform worker 250 to notify build service 240 and/or client device 290 regarding the status of the data transformation job. The process 700 may then end.

5.0 Implementation Mechanisms—Hardware Overview

Figure 5:
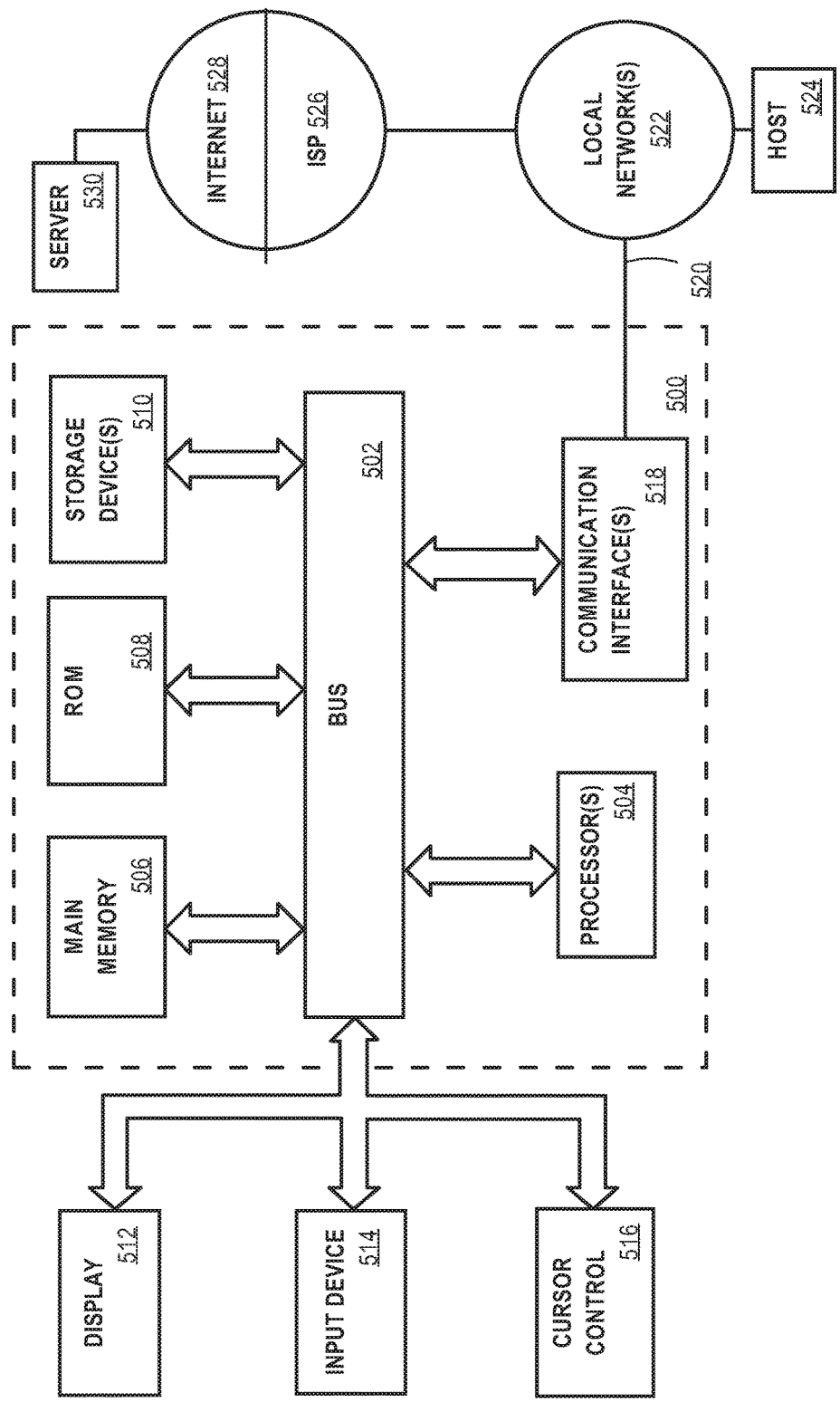
FIG. 5 is a block diagram of a computing device in which the example embodiment(s) of the present invention may be embodied.

Referring now to FIG. 5, it is a block diagram that illustrates a computing device 500 in which the example embodiment(s) of the present invention may be embodied. Computing device 500 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor.

Main memory 506, such as a random access memory (RAM) or other dynamic storage device, also may be coupled to bus 502 for storing information and software instructions to be executed by processor(s) 504. Main memory 506 also may be used for storing temporary variables or other intermediate information during execution of software instructions to be executed by processor(s) 504.

Software instructions, when stored in storage media accessible to processor(s) 504, render computing device 500 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and software instructions for processor(s) 504.

One or more mass storage devices 510 may be coupled to bus 502 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 5, one or more of display 512, input device 514, and cursor control 516 are external components (i.e., peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such software instructions may be read into main memory 506 from another storage medium, such as storage device(s) 510. Execution of the software instructions contained in main memory 506 cause processor(s) 504 to perform the functions of the example embodiment(s).

While functions and operations of the example embodiment(s) may be implemented entirely with software instructions, hard-wired or programmable circuitry of computing device 500 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more software instructions to processor(s) 504 for execution. For example, the software instructions may initially be carried on a magnetic disk or solid-state drive of a remote computer. The remote computer can load the software instructions into its dynamic memory and send the software instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the software instructions. The software instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution.

6.0 Implementation Mechanisms—Software Overview

Figure 6:
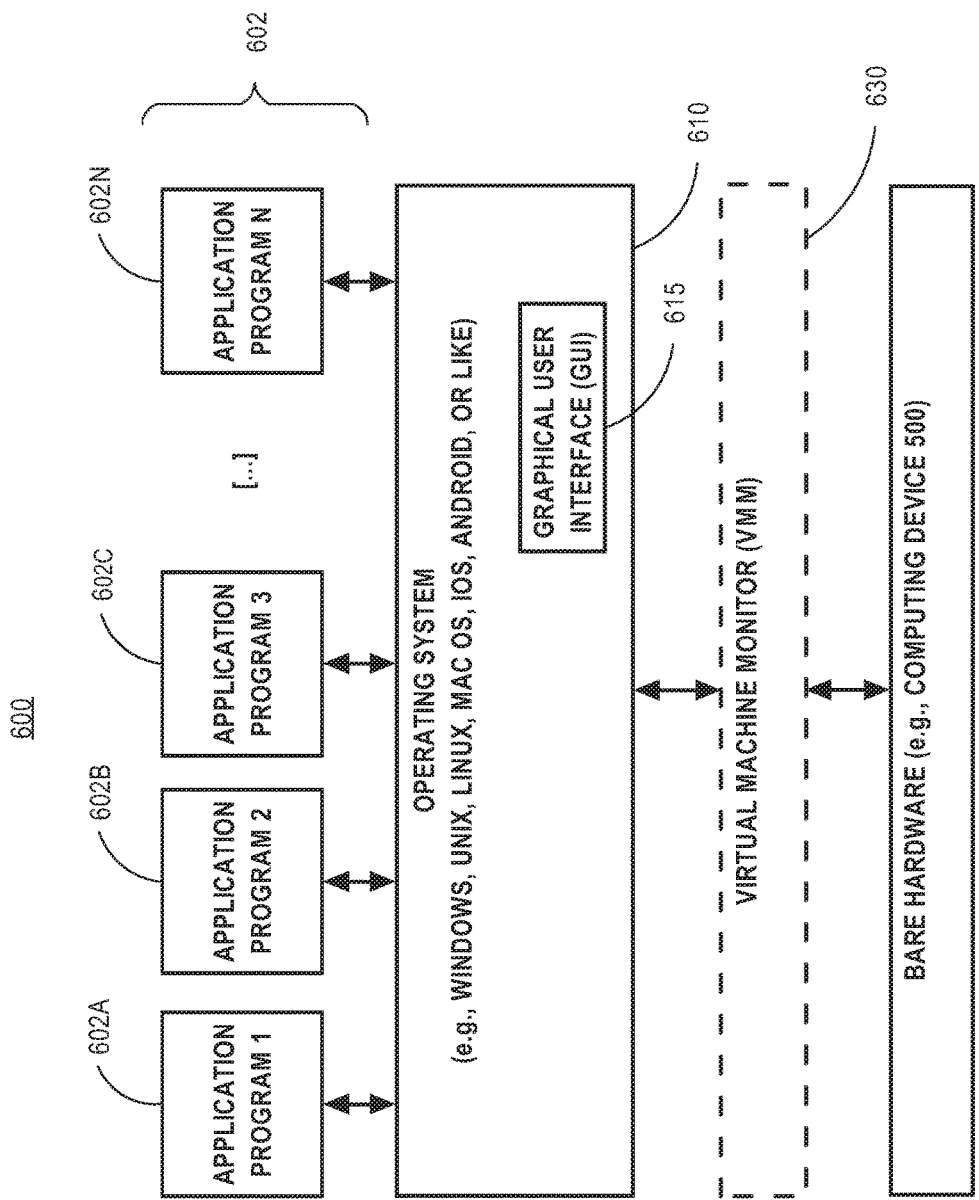
FIG. 6 is a block diagram of a software system for controlling the operation of the computing device.

FIG. 6 is a block diagram of a software system 600 that may be employed for controlling the operation of computing device 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing device 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on device 600 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of device 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the device 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of device 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

7.0 Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method performed by one or more processors, the method comprising:

receiving user code comprising at least a portion of a computer program via data retrieval from a computer data storage device or input from a computer input device;

digitally storing the user code at a first code repository;

building the user code into executable code comprising one or more machine executable computer program files, wherein building the user code comprises:

generating the executable code, based on the user code and a first criteria, and digitally storing the executable code in a second repository which is different from the first code repository, wherein the first criteria comprises a criteria for obfuscating sensitive data and the second repository is a blobstore;

generating a job specification, based on the user code and a second criteria, and digitally storing the job specification in a computer memory;

launching computer execution of an application server, using the executable code and the job specification;

receiving data transformation instructions that specify a process for transforming a first dataset to a second dataset;

in response to receiving data transformation instructions, executing, using the executable code, the data transformation instructions in the application server.

2. The method of claim 1, wherein the first criteria comprises information related to scheduling of a build job for generating executable code.

3. The method of claim 1, wherein the application server is launched in a cluster of a plurality of application servers.

4. The method of claim 1, further comprising providing status information to a client device regarding the execution of the data transformation instructions.

5. The method of claim 1, further comprising:

prior to storing the user code at the first code repository, determining that the user code is authorized based on a first permission setting;

in response to determining that the user code is authorized, performing the step of storing the user code at the first code repository;

prior to executing the data transformation instructions in the application server, determining that the data transformation instructions are authorized based on a second permission setting; and in response to determining that the data transformation instructions are authorized, performing the step of executing the data transformation instructions in the application server.

6. The method of claim 1, wherein the method further comprises:

during the generating the executable code, including, in the executable code, one or more libraries capable of obfuscating sensitive data.

7. One or more non-transitory computer-readable storage medium storing one or more sequences of instructions which, when executed by one or more processors, cause:

receiving user code comprising at least a portion of a computer program via data retrieval from a computer data storage device or input from a computer input device;

digitally storing the user code at a first code repository;

building the user code into executable code comprising one or more machine executable computer program files, wherein building the user code comprises:

generating the executable code, based on the user code and a first criteria, and digitally storing the executable code in a second repository which is different from the first code repository, wherein the first criteria comprises a criteria for obfuscating sensitive data and the second repository is a blobstore;

generating a job specification, based on the user code and a second criteria, and digitally storing the job specification in a computer memory;

launching computer execution of an application server, using the executable code and the job specification;

receiving data transformation instructions that specify a process for transforming a first dataset to a second dataset; and in response to receiving data transformation instructions, executing, using the executable code, the data transformation instructions in the application server.

8. The one or more non-transitory computer-readable storage medium of claim 7, wherein the first criteria comprises information related to scheduling of a build job for generating executable code.

9. The one or more non-transitory computer-readable storage medium of claim 7, wherein the application server is launched in a cluster of a plurality of application servers.

10. The one or more non-transitory computer-readable storage medium of claim 7, further comprising instructions which, when executed by one or more processors, cause providing status information to a client device regarding the execution of the data transformation instructions.

11. The one or more non-transitory computer-readable storage medium of claim 7, further comprising instructions which, when executed by one or more processors, cause:

prior to storing the user code at the first code repository, determining that the user code is authorized based on a first permission setting;

in response to determining that the user code is authorized, performing the step of storing the user code at the first code repository;

determining that the data transformation instructions are authorized based on a second permission setting; and in response to determining that the data transformation instructions are authorized, performing the step of executing the data transformation instructions in the application server.

12. The one or more non-transitory computer-readable storage medium of claim 7, further comprising instructions which, when executed by one or more processors, cause:

during the generating the executable code, including, in the executable code, one or more libraries capable of obfuscating sensitive data.

\* \* \* \* \*